INVENTORS
OTIS E. STAPLES
ANTHONY J. BENT
BY
Hudson, Boughton,
Williams, David & Hoffmann.
ATTORNEYS INVENTORS
OTIS E. STAPLES
ANTHONY J. BENT
BY Hudson, Boughton,
Williams, David & Hoffmann
ATTORNEYS

United States Patent Office 2,847,910
Patented Aug. 19, 1958

2,847,910

HOBBING MACHINE

Otis E. Staples, Cleveland, and Anthony J. Bent, Willoughby, Ohio, assignors, by mesne assignments, to Textron Inc., a corporation of Rhode Island Original application April 12, 1949, Serial No. 86,952, now Patent No. 2,700,324, dated January 25, 1955. Divided and this application July 7, 1954, Serial No. 441,794

3 Claims. (Cl. 90—4)

The present invention relates to machine tools and more particularly to machines for hobbing gears and the like and, particularly, to hobbing machines of the axial feed type as distinguished from tangential feed type hobbing machines. The instant application is a division of application Serial No. 86,952, now Patent 2,700,324 issued January 25, 1955.

An important object of the invention is the provision of a new and improved hobbing machine of the axial feed type having a vertically movable work head and a novel compact driving mechanism for moving the work head comprising a cooperating lead screw and nut the former of which is fixed against axial movement in the base of the machine while the latter is supported against axial movement in the housing of the work head with either or both being driven to selectively cause relatively rapid travel of the work head or relatively slow travel of the work head, this latter travel being in timed relation with the rotation of the work spindle and hob arbor.

Another object of the invention is the provision of a hobbing machine of the axial feed type having a vertically movable work head and a novel driving mechanism for moving the work head, which mechanism comprises a cooperating screw and nut the former of which is fixed to the base of the machine while the latter is rotatably supported in the housing of the work head and wherein the nut is driven by a motor carried by the work head housing for causing relatively rapid travel of the work head and by the motor which drives the work spindle and the hob arbor for causing relatively slow travel or feed of the work head in timed relation with the rotation of the work spindle and hob arbor.

Another object of the present invention is the provision of a novel machine having an upright column supporting a tool head, a work head movable vertically along guides on the column, the work head including a work holding spindle and a screw mechanism for moving the work head vertically, the screw mechanism being located to the outside of the work spindle with respect to the upright column, to minimize the overhang of the work head whereby greater accuracy in cutting is effected.

The invention resides in certain steps of procedure, constructions and combinations and arrangements of parts, and further objects and advantages will be apparent from the following description of the preferred embodiment described with reference to the accompanying drawings forming a part of this specification, in which similar reference characters designate corresponding parts, and in which Fig. 1 is a side elevational view of a hobbing machine embodying the present invention;

Although the invention is susceptible of various modifications and alternative constructions, it is herein shown and described as embodied in a hobbing machine generally of the type shown in United States Patent No. 2,307,428, issued January 5, 1943, except that, among other things, the shape of the machine is slightly different, for example, the hob head is carried by a member slidably supported in a cylindrical aperture in the vertical column or frame rather than being supported on horizontal ways, and the mechanism for moving the work head vertically is of a different arrangement.

Figure 1:
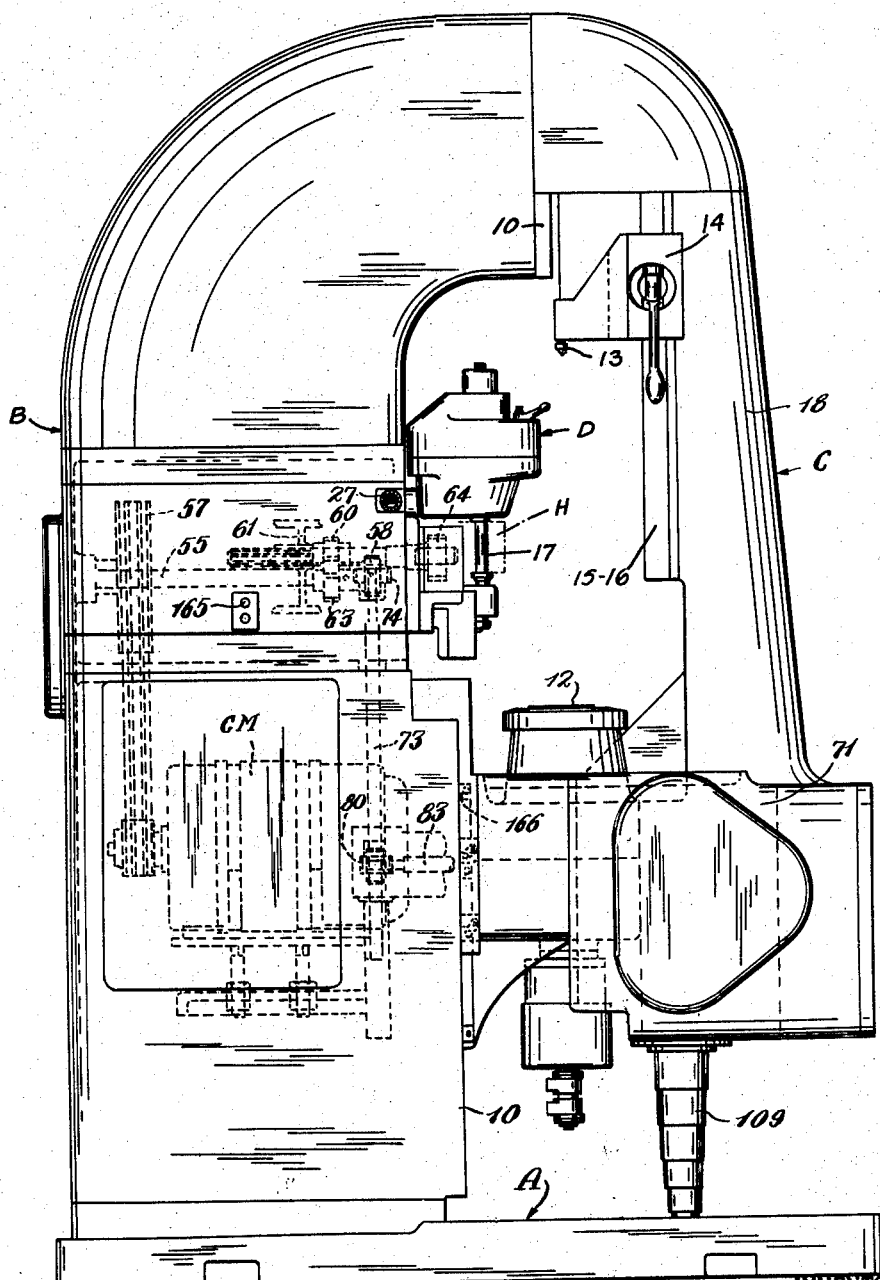
Figure 2:
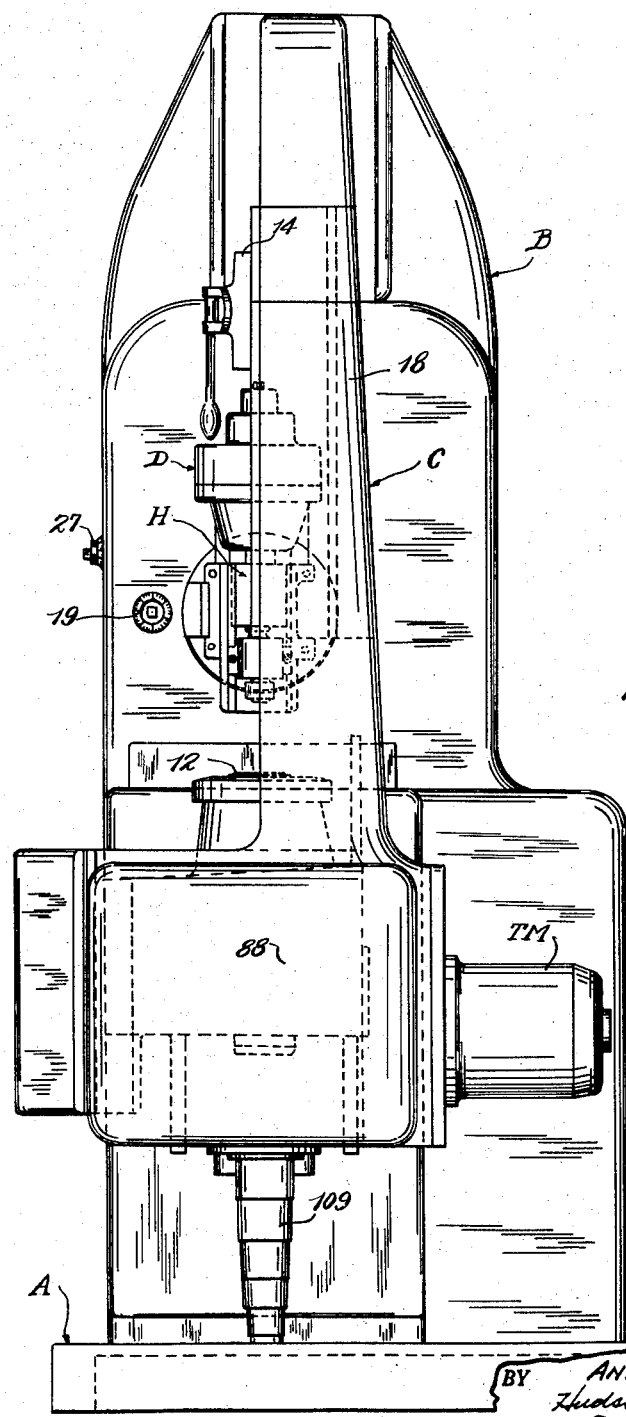
Fig. 2 is a front view of the hobbing machine shown in Fig. 1.

Generally speaking, the machine is of vertical construction and comprises a base A, a vertical column or gooseneck B supported upon the base A, a work head C vertically movable upon vertically spaced pairs of ways 10, 10 on the column B, and a tool or hob head D carried by a cylindrical member slidably supported in the column B and adjustable therein horizontally toward and from the work head. The workpiece to be hobbed, which may be a gear blank, a shaft to be splined, or the like, is supported for rotation by a work spindle 12, forming a part of the work head C, and a tail center 13 carried by a tail slide 14 supported for movement toward and from the work spindle upon ways 15, 16 on an outboard column 18 constituting a part of the work head. A hob arbor 17 is rotatably supported in the hob head D, and during operation of the machine is rotated in timed relation to the rotation of the work spindle 12 by a cut motor CM located in the lower part of the column B and operatively connected to the arbor and work spindle. The workpiece is moved vertically past the hob during the cutting operation to effect the normal feeding operation, by vertical movement of the work head C, which movement is timed with the rotation of the hob arbor. Simultaneously with the other movements and in timed relation therewith, the arbor is moved axially to advance the unused portions of the hob, which is indicated at H in Figs. 1, 2 and 3, into cutting relation with the workpiece, which workpiece is rotated in a direction such that the peripheral portion engaged at any instant by the hob moves in a direction opposite to that of the axial movement of the hob. Rapid traverse means, including a reversible rapid traverse motor TM, is provided to cause relatively rapid movement of the work head to carry the workpiece from a work loading position to the cutting position and to return the work head to the loading position after the cutting operation has been performed.

The structure of the hob head is described in detail in the aforesaid application and will not be repeated herein since it is not necessary for an understanding of the present invention. Suffice it to say that the hob head D is supported on the column B for horizontal movement toward and away from work supported on the work spindle 12 and for angular movement in a vertical plane. The horizontal positioning of hob head D is controlled by rotation of a dial 19 on column B while the angular positioning is controlled by turning a rotatable member 27. The hob arbor 17 is rotated by the cut motor CM through a main drive shaft 55 journalled in the column B and which has a pulley 57 mounted thereon which is driven by the cut motor through a belt. The main drive shaft 55 is adapted to drive a parallel, splined shaft 58 which is journalled in the column B and is supported in a gear 60 journalled in a web 61 of a cylindrical boss structure 62 which projects from the rear wall of column B. The gear 60 is driven by a gear 63 mounted on the drive shaft 55, and gear 60 is splined to the shaft 58 so that the latter may be driven throughout the horizontal adjustments of the hob head. The forward end of the shaft 58 extends into the hob head housing and has a helical gear 64 thereon operatively connected to the arbor drive gear.

The work spindle 12, which is tubular in construction, has its upper end journalled by suitable antifriction bearings in a cylindrical boss formation 70 on the work head C, and its lower end is journalled in an antifriction bearing in an opening through the bottom wall of the work head housing 71. Preferably, the work spindle 12 is provided with a pneumatically operated chuck for holding the work pieces. The chuck is not shown as such chucks are well known, however, a portion of the pneumatic mechanism 72 for operating the chuck is shown attached to the lower end of the spindle. The spindle 12 is driven in timed relation to the hob arbor 17 by the cut motor CM, through a drive mechanism which includes a vertical shaft 73 the upper end of which is journalled in the column B and is provided with a helical gear 74 driven by a helical gear 78 on shaft 55. The shaft 73 projects downwardly into a channel 79 formed in the column B and is splined throughout a substantial portion of its length. The splined portion of the shaft 73 is slidably engaged by a helical gear 80 splined thereto. The gear 80 is journalled in a projection 81 integral with the housing 71 and which extends into the channel 79. A cross shaft 83 having one end journalled in the projection 81 and the opposite end journalled in a partition wall 84 of the work head housing, is driven by gear 80 through a gear 85 mounted on the end of the shaft journalled in the projection. It will be seen that the drive between gears 80 and 85 will be maintained throughout the vertical range of movement of the work head C by reason of the spline connection between shaft 73 and gear 80.

The shaft 83 drives a speed change gear train, indicated generally at 87, which is located within the front compartment 88 formed in the work head housing 71. The gear train drives a shaft 93, which comprises one input element of a differential 94 in the drive for the work spindle 12. The output of the differential 94, comprises a shaft 96 having a worm 97 which drives a worm gear 98 integral with the spindle 12.

The differential 94 comprises a cage 100 carrying four planetary gears 101 which gears mesh with two axially aligned sun gears 102, 103 formed on the adjoining ends of the aligned input and output shaft 93, 96, respectively. The cage 100 has a helical gear 104 by which rotation of the cage is controlled. When the cage is stationary and shaft 93 rotates, shaft 96 will be driven directly. If the cage is rotated, the shaft 96 is driven at a speed which is the algebraic sum of the speeds of the cage and input shaft 93. When it is desirable to cut spur teeth on gear blanks, for example, the cage is locked to prevent rotation thereof and the workpiece will be moved past the hob to effect the cutting of straight gear teeth. In the event it is desired to cut spiral teeth, the cage is rotated to change the speed of rotation of the work spindle 12 relative to the movement of the work head C and cause spiral teeth to be formed, as is well understood by those familiar with the art.

Figure 3:
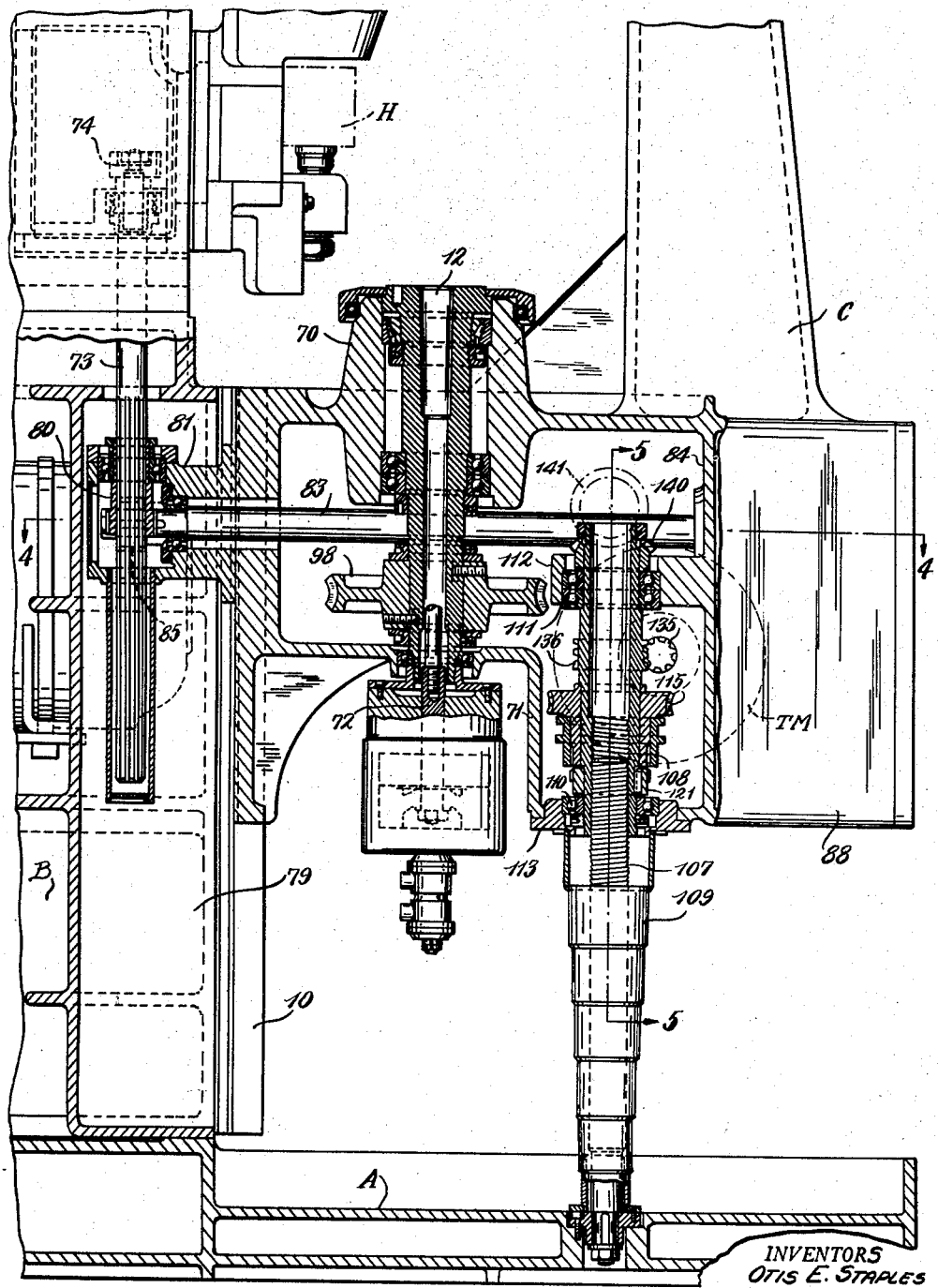
Fig. 3 is a fragmentary enlarged view, partly in section, of the hobbing machine of Fig. 1, showing the work spindle and elevation mechanism for the work head, the section being taken substantially on line 3—3 of Figs. 4 and 5.
Figure 4:
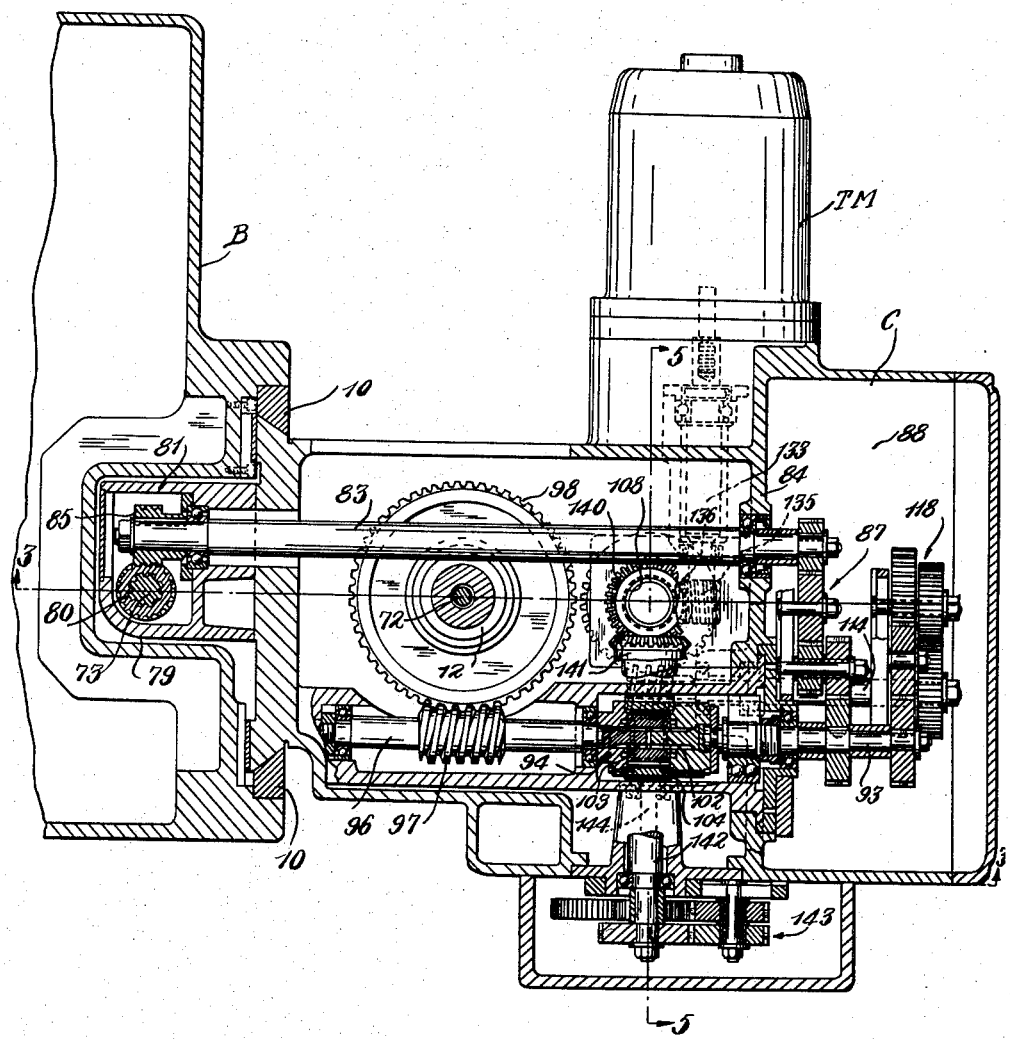
Fig. 4 is a sectional view taken substantially on line 4—4 of Fig. 3.

The work head C, see Figs. 3 and 4 is supported by a screw 107, the lower end of which, in the illustrated embodiment, is non-rotatively attached to the base A and the upper end of which has a tubular nut 108 threaded thereon. Preferably, the screw 107 is enclosed in a telescoping guard 109, for shielding the screw from chips and other foreign particles which might otherwise collect on the threads thereof. The nut 108 is journalled at its lower end in an antifriction combination thrust bearing 110 mounted in the lower walls of the work head housing and its upper end is journalled in bearings 111 mounted in a bracket 112 integral with the partition 84 in the work head housing 71. When the nut 108 is rotated, by means described hereinafter, the head C is moved vertically in a direction depending on the direction of rotation of the nut. The screw 107 extends through a flanged ring 113 which is mounted in an opening in the lower wall of the work head housing and bearing 110 is secured in the ring. The inner race of the bearing 110 is attached to the nut 108.

The nut 108 is adapted to be rotated by either the cut motor CM or the traverse motor TM, and automatically controlled means is provided for rendering one or the other of the motors effective to drive the nut at the proper times and in the proper direction. The cut motor drive mechanism for the nut 108 includes a worm gear 115 in mesh with and driven by, a worm 116, shown in Fig. 5, formed on a shaft 114 rotatably supported in the work head housing 71 and operatively connected to the shaft 93 by a speed change gear train 118, see Fig. 4. The worm gear 115 is rotatively mounted on the nut 108 and is provided with a downwardly extending hub 117, the lower portion of which is externally splined. A clutch collar 120 surrounds the hub 117 and has teeth slidingly engaged with the hub splines for connecting the work gear 115 with the collar 120 throughout a range of sliding movement of the collar on the hub. A sleeve 121 keyed to the nut 108 immediately below the lower splined end of the hub 117 of the worm gear 115, has its upper portion splined as at 122 to receive the internal teeth of the collar 120 when the collar is lowered over the upper portion of the sleeve. Thus, by sliding the clutch collar 120 downwardly and upwardly, as viewed in Fig. 7, the worm 115 is drivingly connected and disconnected, respectively, with the nut 108.

The clutch collar 120 is moved vertically by a yoke 123 which has pins 124 extending into a peripheral groove 125 formed in the collar. The yoke is moved by an electrical solenoid 126 which has an armature 127 associated therewith and which is connected with a rack member 128 which cooperates with pinion 129 formed on a rocker shaft 130 to rotate the latter shaft when the armature is attracted and released from the solenoid. An arm 132 on the rocker shaft is connected to the clutch yoke 123, and when the solenoid is energized, the yoke is lowered, as viewed in Fig. 5, for connecting gear 115 with the nut 108. When the solenoid is deenergized, the armature drops and the yoke is raised to disconnect the gear 115 and nut 108. The solenoid 126 is controlled by a suitable control circuit, not shown, according to the vertical position of the work head C relative to the hob head.

Figure 5:
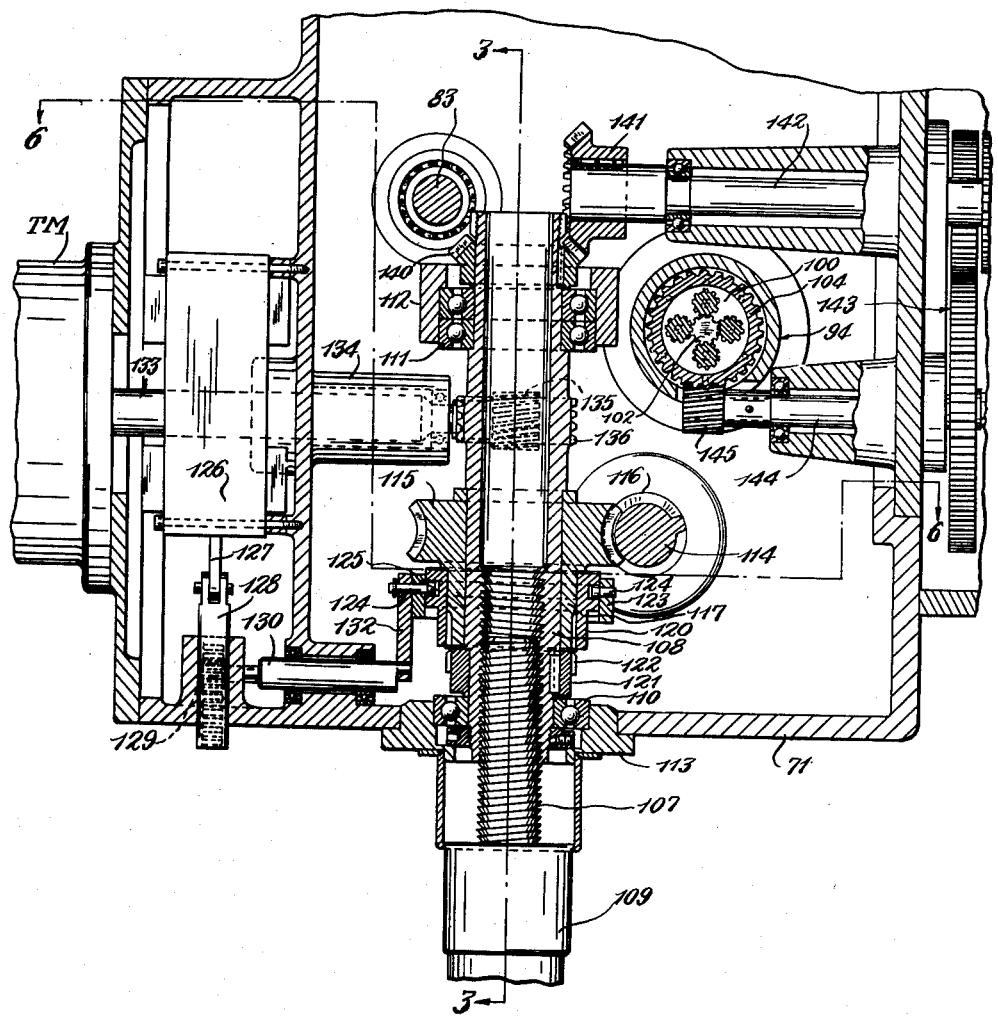
Fig. 5 is an enlarged sectional view taken substantially along line 5—5 of Fig. 4.
Figure 6:
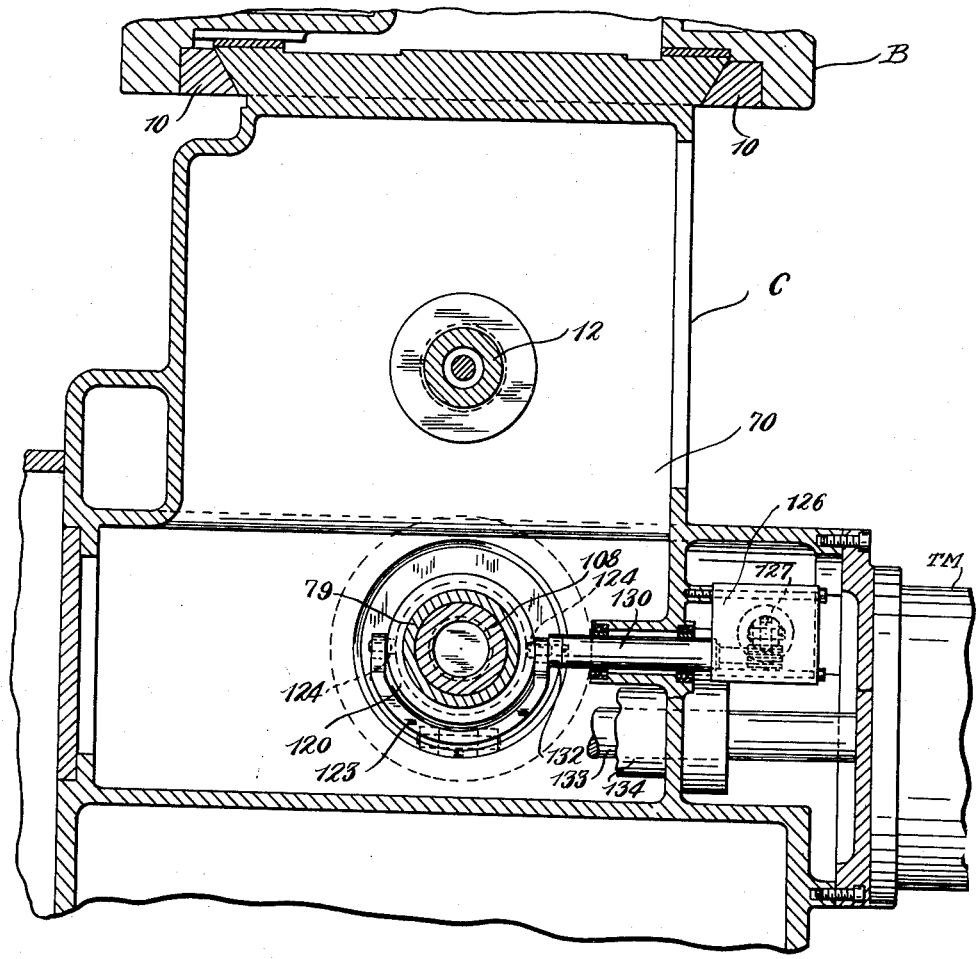
Fig. 6 is a sectional view taken substantially along line 6—6 of Fig. 5.

The traverse motor TM is mounted on the exterior of the left hand wall of housing 71, as viewed in Fig. 5, and it is drivingly connected with the nut 108 by a shaft 133 connected to the motor armature shaft and journalled in a bearing housing 134. A helical gear 135 connected to the end of shaft 133 opposite the motor, is continuously in mesh with a helical gear 136 formed integral with the nut 108. The traverse motor is connected in driving relation with the nut 108 at all times, and it is adapted to rotate the nut at a rapid rate, relative to that at which the nut is driven by the cut motor, for moving the work head C vertically to cutting position and to return the work head to loading position. The control system for the hobbing machine is arranged such that when the nut 108 is driven by gear 115, the traverse motor is deenergized and it may be driven through the gears 135, 136.

When the hobbing machine is used to cut spiral gear teeth, or the like, the cage 100 of the differential 94 is driven in timed relation to the rotation of the nut 108; as shown, the cage 100 is operatively connected to the nut 108 by drive mechanism which includes miter gears 140, 141 on the upper end of the nut 108 and a horizontally extending shaft 142, respectively, seen in Fig. 5. The shaft 142 is adapted to drive a speed change gear train 143 located in a compartment formed in the side of the workhead housing 71 and opposite the rapid traverse motor. The gear train 143 drives a shaft 144 having a helical gear 145 thereon which drives the gear 104 connected to the cage 100. The rotation of the cage 100 imposes a differential in speed between the input shaft 93 and the drive shaft 96 for the spindle 12 according to the speed of the nut 108. If it is desired to cut straight gear teeth, or the like, the gear train 143 is disconnected and the cage 100 held against rotation with the result that a direct drive is had through the differential.

It will be seen that as the workpiece is fed vertically past the hob, the piece is rotated on its axis at a certain speed relative to the speed of the hob, and the rate of vertical feed of the workpiece has a definite relationship to the hob speed.

In operation of the machine, a new or sharp hob is mounted on the arbor 17 and the latter is drawn upwardly so that the end of the hob will initially engage a workpiece mounted in the spindle 12. The workpiece is chucked in the spindle 12 and secured therein by the tail stock member 13 and the hob head D is adjusted horizontally so that when it engages the workpiece it will cut to the proper depth. It is to be understood, of course, that the hob head D will be rotated or positioned approximately 90° from the position shown in Figs. 1 and 2 so that the axis of the hob will extend transverse with respect to the axis of the workpiece. For purpose of explanation, it will be assumed that the machine is set for conventional hobbing and that the workpieces are loaded when the work head is in its lowest position. The automatic control of the cut motor, the rapid traverse motor and the solenoid 126 may be effected by a control system, parts of which are shown at 165 and 166, and which may be similar to that described in the aforementioned patent and in which case the solenoid 126 would be connected in the control circuit in such a manner that it would be energized and deenergized simultaneously with the energization and deenergization of the rapid traverse motor. The cycle of operation is initiated by actuation of the start push button switch 165 which causes the traverse motor to rapidly elevate the work head C to a point at which the workpiece closely approaches the hob. The traverse motor is then automatically deenergized and the clutch solenoid 126 is energized to connect gear 115 with the nut 108 so that the work head C will continue to move vertically but at a relatively slow rate past the hob H while the hob and workpiece both rotate in timed relation. After the workpiece is moved past the hob, the clutch solenoid and the cut motor are automatically deenergized and the finished work is removed from the spindle 12, after which the start push button switch 165 is again depressed thereby causing the traverse motor to operate in a reverse direction from its initial direction to rapidly lower the work head C to the loading position, at which point the traverse motor is automatically deenergized. A new workpiece is mounted to the work head and the cycle of operation is repeated as described.

As is explained in detail in the aforesaid application, during the cutting operation the hob H is continuously advanced in the direction which is counter to the direction of movement of the periphery of the workpiece at its point of engagement with the hob so that unused portions of the hob will be continuously fed into tangential engagement with the workpieces and the initial engagement of the unused portions with the workpieces will be with portions of the work which have been cut by used portions of the hob. In other words, the used portions of the hob will rough out the cuts and the less used portions will perform the finished cuts so that greater accuracy is achieved in the finished workpiece and at the same time a maximum useful life of the hob is attained.

It should be noted that the screw 107 on which the work head C is moved vertically is located on an axis which is substantially at the center of mass of the work head C so that a minimum of stress is applied to the guides 10, 11, 15 and 16, which increases the accuracy and durability of the machine. This arrangement also permits the work spindle 12 to be located adjacent to the column B which provides a minimum of overhang of the work head and provides greater stability for the spindle. In addition, the structural arrangement shown provides a relatively compact driving mechanism for rotating the work spindle 12, the hob arbor 17 and the elevating nut 108 or lead screw 107.

Suitable means may be provided for lubricating the various gears and bearings and a suitable coolant may be fed to the hob and workpieces, but since such means are commonly used, they have not been shown in the embodiment of the invention described.

While the preferred form of the invention has been described in considerable detail, it is to be understood that this is by way of example only and that the invention is not limited to the particular details shown and described.

Having thus described our invention, we claim:

1. In a hobbing machine, a frame, a tool spindle rotatively supported by said frame, a work head including a work spindle supported for vertical movement with respect to said frame, means for moving said work head vertically comprising cooperating nut and vertical lead screw elements, means connecting said lead screw element to said frame below said work head and for supporting said lead screw element against axial and rotative movement, means for rotatably connecting said nut to said work head and for transmitting translatory movement of said nut to said work head, power actuated means including a gear train for rotating said work spindle and said tool spindle in timed relation, and means for operatively connecting said nut element to said gear train for rotation thereby and including a clutch member movable to engage or disengage the drive to said nut element from said gear train, and a motor on said work head operatively connected to said nut element for relatively rotating the same at a relatively rapid rate.

2. In a hobbing machine, a frame, a tool spindle rotatively supported by said frame, a work head including a work spindle supported for vertical movement with respect to said frame, means for moving said work head vertically comprising a relatively rotatable cooperating nut and vertical lead screw elements, means connecting said lead screw element to said frame and for supporting said lead screw element against axial movement, means for connecting said nut element to said work head to transmit axial translatory movement of said nut element to said work head, means including a gear train for rotating said work spindle and said tool spindle in timed relation, means for operatively connecting one of said nut and lead screw elements to said gear train for relatively rotating said nut and lead screw elements including a clutch member movable to engage or disengage the drive to said one element from said gear train, power actuated means operatively connected to said nut and lead screw elements for relatively rotating said nut and lead screw element at a relatively high speed, and means operable to disengage said clutch member upon operation of the last-said power actuated means.

3. In a machine tool, a frame; a work head mounted for vertical movement on the frame; a work spindle; means for moving the work head vertically comprising,, a screw mounted on said frame; a nut threaded on the screw and rotatably connected with said head for moving the latter; a drive for rotating the nut; a motor for operating said drive; and means for rotating said work spindle comprising, a differential, one input element of said differential being driven by said nut and the other input element of said differential being driven by said motor.

(References on following page)

References Cited in the file of this patent

UNITED STATES PATENTS

| | | |
|---|---|---|
| 1,278,867 | Daneke | Sept. 17, 1918 |
| 1,889,930 | Morton | Dec. 6, 1932 |
| 2,157,471 | Armitage | May 9, 1939 |
| 2,231,866 | Adams | Feb. 18, 1941 |
| 2,375,172 | Arter | May 1, 1945 |
| 2,736,243 | Armitage et al. | Feb. 28, 1956 |

FOREIGN PATENTS

| | | |
|---|---|---|
| 127,185 | Austria | Mar. 10, 1932 |